Patented Jan. 2, 1951

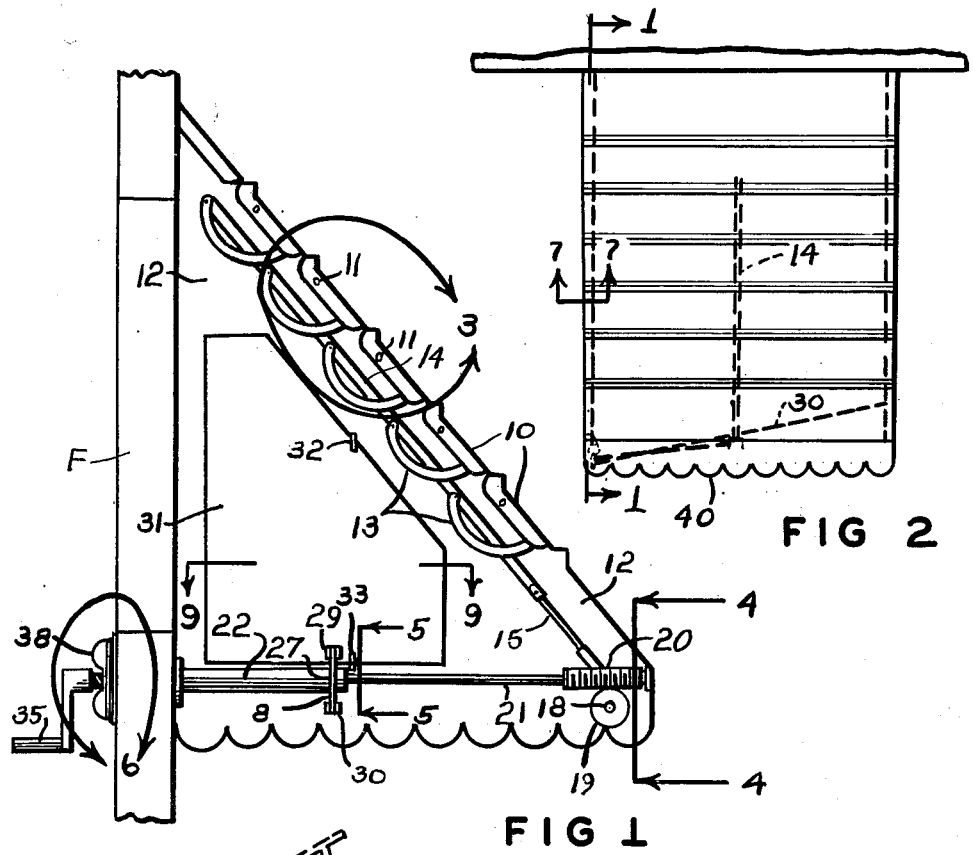
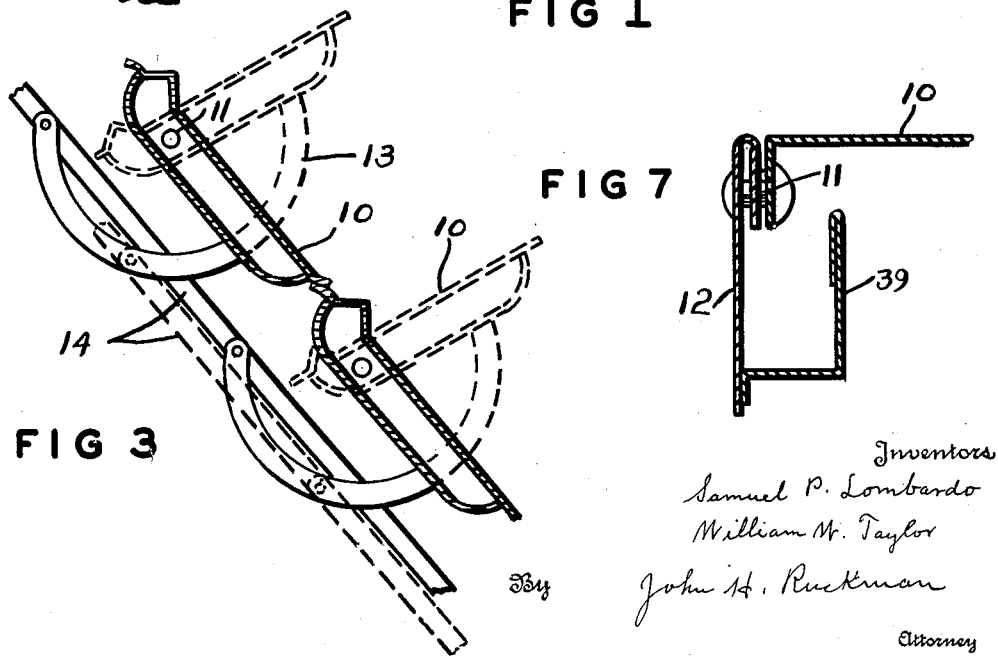

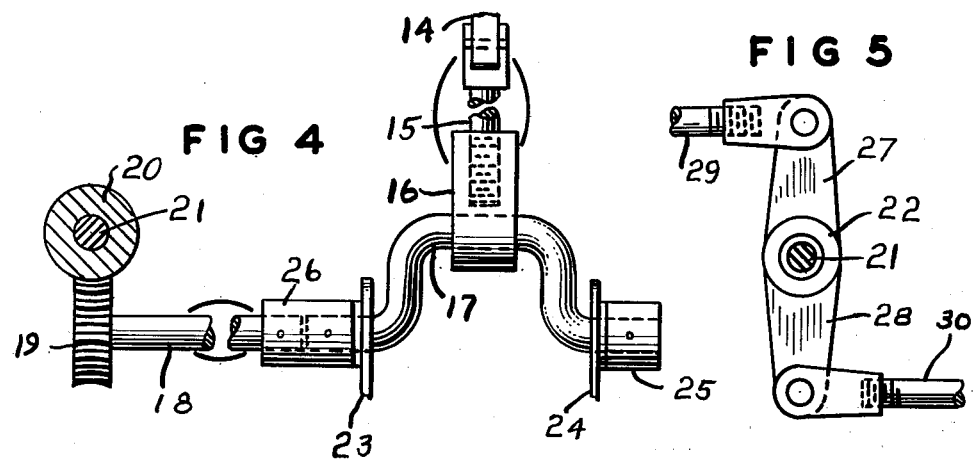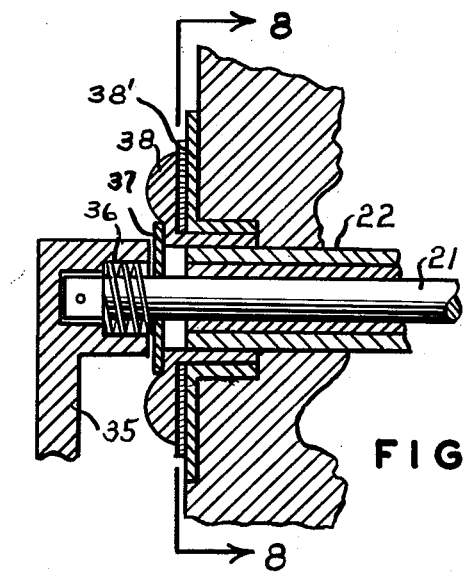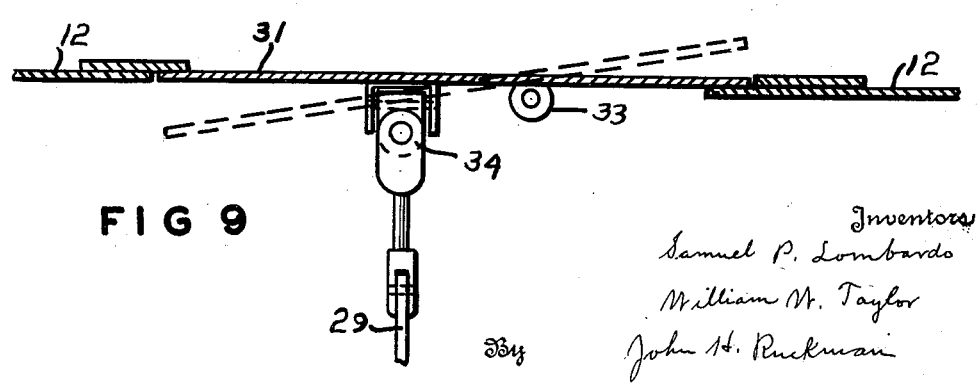

2,536,755

UNITED STATES PATENT OFFICE 2,536,755

ADJUSTABLE WINDOW AWNING

Samuel P. Lombardo and William W. Taylor,
Bay St. Louis, Miss.

Application May 8, 1947, Serial No. 746,722

1 Claim. (Cl. 20—57.5)

Our invention relates to adjustable window awnings. An object of the invention is to provide an all weather awning which can be permanently attached to a window frame. Another object is to provide an awning having blades which can be opened to admit light and air and closed to protect the window from rain, storms, and sun. Another object is to provide an awning having side doors which may be opened and closed independently of the blades to admit air. Another object is to provide a device of this character which can be shipped in unassembled condition and readily assembled and installed for use. Another object is to provide an awning having blades of rigid material such as metal, wood or plastic.

The novel features which we believe to be characteristic of this invention are set forth with particularity in the appended claim. The invention, however, both as to organization and operation, together with additional objects and advantages thereof, will be best understood from the following description of a specific embodiment when read in connection with accompanying drawings in which, Fig. 1 is a side elevational view on the line 1—1 of Fig. 2 showing the blades of the awning closed.

Fig. 2 is a front elevational view.

Fig. 3 is a detail view on an enlarged scale of the portion shown inside of the curved line 3 in Fig. 1.

Fig. 4 is an enlarged detail view in section on the line 4—4 of Fig. 1.

Fig. 5 is an enlarged detail view in section on the line 5—5 of Fig. 1.

Fig. 6 is an enlarged detail view of the portion shown inside of the curved line 6 in Fig. 1.

Fig. 7 is an enlarged view in section on the line 7—7 of Fig. 2.

Fig. 8 is a view in section on the line 8—8 of Fig. 6.

Fig. 9 is an enlarged view in section on the line 9—9 of Fig. 1.

Referring to the drawings, the letter F designates a customary window frame which surrounds a window opening. The top of the awning is supported in any suitable manner from the top of the frame F, and the frame has side plates 12 secured thereto and containing openings referred to later. The awning includes a series of similar blades 10 shown in closed position in Fig. 1 and shown in Fig. 3 in open position by dash lines. The ends of the blades are pivoted at 11 in the inclined sides 12. The lower portions of the blades, at the middle thereof, are secured to ends of curved arms 13 whose other ends are pivoted to a connecting bar 14, the lower end of which is connected by a rod 15 to a member 16 which rotatably receives the offset portion of a crank arm 17 as best shown in Fig. 4. This arm is formed in a shaft 18 on which a worm wheel 19 is secured which engages a worm 20 on one end of a worm shaft 21, the other end of which passes through a tube 22. As shown in Fig. 4, the shaft 18 is mounted in bearings 23 and 24. On one end of this shaft a collar 25 is pinned for use on a single window. On the opposite portion of the shaft 18, a connecting sleeve 26 is pinned to adapt the shaft for use with multiple windows.

As best shown in Fig. 5, control arms 27 and 28 are secured to the tube 22. A rod 29 is pivoted to the end of the arm 27 while a rod 30 is pivoted to the end of the arm 28. As indicated in Fig. 1, a door or panel 31 is pivoted to each of the sides of the awning on an upper pivot 32 and a lower pivot 33, these doors being adapted to fit into the openings in the sides of the awning structure previously referred to. The rod 29 is connected to the door which is on the rear side by a universal joint 34 while the rod 30 as indicated in Fig. 1 passes across to the door which is on the far side and is attached thereto by a universal joint such as 34. The worm shaft is adapted to be turned by any suitable mechanism as by the hand crank 35 secured to the outer end thereof and having a recess containing a spring 36 as shown in Fig. 6 which bears on a washer 37. This washer engages a thumb adjusting annular member 38, the face of which is serrated for contacting an angular member 38' secured to the tube 22 in order to operate the doors 31. As shown in Fig. 7, the blades 10 have pivotal connection 11 with the side members 12 of the awning structure and these side members have offset flanges 39 secured thereto for forming gutters to drain off any rain water which might get through. Figs. 1 and 2 show the lower edge of the awning provided with an ornamental skirt.

The operation and advantages of our invention will be apparent in connection with the foregoing description and the accompanying drawings. As clearly indicated in Fig. 2, the connecting bar 14 extends up the middle of the awning so that the blades are operated without jamming or straining. The awning may be readily applied to homes and commercial buildings. For store fronts, the awning would be installed in series and could be operated by a hand crank or motor. The side doors when open admit air into the window openings even if the blades are closed. Both the blades and the doors may be open or closed and either one may be open or closed regardless of the position of the other one.

The blades 10 may be opened and closed by giving the shaft 21 a partial turn in one direction or the other. The doors 31 may be opened and closed independently of the blades by giving a rotative movement to the thumb member 38 and attached tube 38 which rotatable surrounds the shaft.

We claim:

An awning of the character described, comprising triangular side plates extending outwardly from opposite sides respectively of a window frame, a series of transverse blades whose ends are pivoted along the diagonal edges of said plates respectively, a rotatable shaft extending forwardly under the awning, operating connections between said shaft and blades operated upon rotation of said shaft for opening and closing the blades, said side plates containing openings, vertical doors in said openings pivoted to said side plates respectively, a thumb member, a tube secured to said thumb member and rotatably surrounding said shaft, and operating connections between said tube and said doors for opening and closing the doors independently of said blades.

SAMUEL P. LOMBARDO.
WILLIAM W. TAYLOR.

REFERENCES CITED

The following references are of record in the file of this patent:

UNITED STATES PATENTS

| Number | Name | Date |
|---|---|---|
| 311,510 | Moneyment | Feb. 3, 1885 |
| 1,960,763 | Woddell et al. | May 29, 1934 |
| 2,046,680 | Groeschel et al. | July 7, 1936 |
| 2,239,242 | Miller | Apr. 22, 1941 |
| 2,279,939 | Di Martile | Apr. 14, 1942 |
| 2,296,467 | Dugan | Sept. 22, 1942 |